United States Patent
Kato et al.

(10) Patent No.: US 7,852,258 B2
(45) Date of Patent: Dec. 14, 2010

(54) METHOD AND SYSTEM FOR REDUCING POWER LOSS OF TRANSMITTED RADIO WAVE THROUGH COVER

(75) Inventors: Yusuke Kato, Nisshin (JP); Yutaka Aoki, Nisshin (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 141 days.

(21) Appl. No.: 12/254,314

(22) Filed: Oct. 20, 2008

(65) Prior Publication Data

US 2009/0102700 A1 Apr. 23, 2009

(30) Foreign Application Priority Data

Oct. 19, 2007 (JP) .............................. 2007-272711

(51) Int. Cl.
- *H01Q 1/42* (2006.01)
- *G01P 21/00* (2006.01)
- *G01S 13/00* (2006.01)
- *G01S 7/40* (2006.01)

(52) U.S. Cl. .......................... 342/82; 342/70; 342/165; 342/173; 702/85; 702/94; 343/872

(58) Field of Classification Search .................. 342/22, 342/70–72, 82, 83, 85, 165, 173, 174; 702/85, 702/94, 106; 343/872

See application file for complete search history.

(56) References Cited

U.S. PATENT DOCUMENTS

| | | | | |
|---|---|---|---|---|
| 3,936,736 A | * | 2/1976 | Ray .............................. | 324/642 |
| 4,097,796 A | * | 6/1978 | Lunden ......................... | 324/642 |
| 4,274,048 A | * | 6/1981 | Tricoles et al. ............... | 324/637 |
| 4,303,211 A | * | 12/1981 | Dooley et al. .............. | 244/3.19 |
| 5,066,921 A | * | 11/1991 | Rope et al. ................... | 324/639 |
| 5,371,505 A | * | 12/1994 | Michaels ..................... | 342/360 |

(Continued)

FOREIGN PATENT DOCUMENTS

JP  2001-174540  6/2001

(Continued)

OTHER PUBLICATIONS

Japanese Office Action dated Jul. 21, 2009, issued in corresponding Japanese Application No. 2007-272711, with English translation.

(Continued)

*Primary Examiner*—Thomas H Tarcza
*Assistant Examiner*—Peter Bythrow
(74) *Attorney, Agent, or Firm*—Nixon & Vanderhye PC

(57) ABSTRACT

In a power-loss reducing system, a transmitting unit causes a radar to transmit a measurement radio wave, and a power monitoring unit monitors power of the measurement radio wave transmitted from the radar through a cover while changing a positional relationship between the cover and the radar. An extracting unit extracts a value of the changed positional relationship between the cover and the radar based on a result of the monitoring of the power such that the extracted value of the positional relationship allows reduction of power loss of a radar wave transmitted, through the cover, from the radar located based on the extracted value of the positional relationship.

10 Claims, 7 Drawing Sheets

U.S. PATENT DOCUMENTS

| | | | |
|---|---|---|---|
| 5,485,159 A * | 1/1996 | Zhang et al. | 342/165 |
| 6,184,840 B1 * | 2/2001 | Hsin-Loug et al. | 343/781 P |
| 6,243,024 B1 * | 6/2001 | Yamabuchi et al. | 340/903 |
| 6,249,242 B1 * | 6/2001 | Sekine et al. | 342/70 |
| 6,469,659 B1 * | 10/2002 | Lajiness et al. | 342/173 |
| 6,496,138 B1 * | 12/2002 | Honma | 342/70 |
| 6,686,872 B2 * | 2/2004 | Vacanti | 342/173 |
| 7,023,331 B2 * | 4/2006 | Kodama | 340/435 |
| 7,126,525 B2 * | 10/2006 | Suzuki et al. | 342/70 |
| 7,148,838 B2 * | 12/2006 | Kakishita et al. | 342/70 |
| 7,705,771 B2 * | 4/2010 | Kato et al. | 342/70 |
| 2004/0075603 A1 * | 4/2004 | Kodama | 342/70 |
| 2004/0227663 A1 * | 11/2004 | Suzuki et al. | 342/70 |
| 2005/0024261 A1 * | 2/2005 | Fujita | 342/174 |
| 2009/0102700 A1 * | 4/2009 | Kato et al. | 342/173 |
| 2009/0140911 A1 * | 6/2009 | Kato et al. | 342/70 |
| 2009/0140912 A1 * | 6/2009 | Kato et al. | 342/70 |
| 2009/0146865 A1 * | 6/2009 | Watanabe et al. | 342/27 |

FOREIGN PATENT DOCUMENTS

| | | |
|---|---|---|
| JP | 2002-071788 | 3/2002 |
| JP | 2003-240838 | 8/2003 |
| JP | 2004-125598 | 4/2004 |
| JP | 2005-009922 | 1/2005 |
| JP | 2005-033475 | 2/2005 |
| JP | 2006-242622 | 9/2006 |
| JP | 2006-317162 | 11/2006 |

OTHER PUBLICATIONS

Japanese of Action dated Mar. 23, 2010, issued in corresponding Japanese Application No. 2007-272711, with English translation.

* cited by examiner

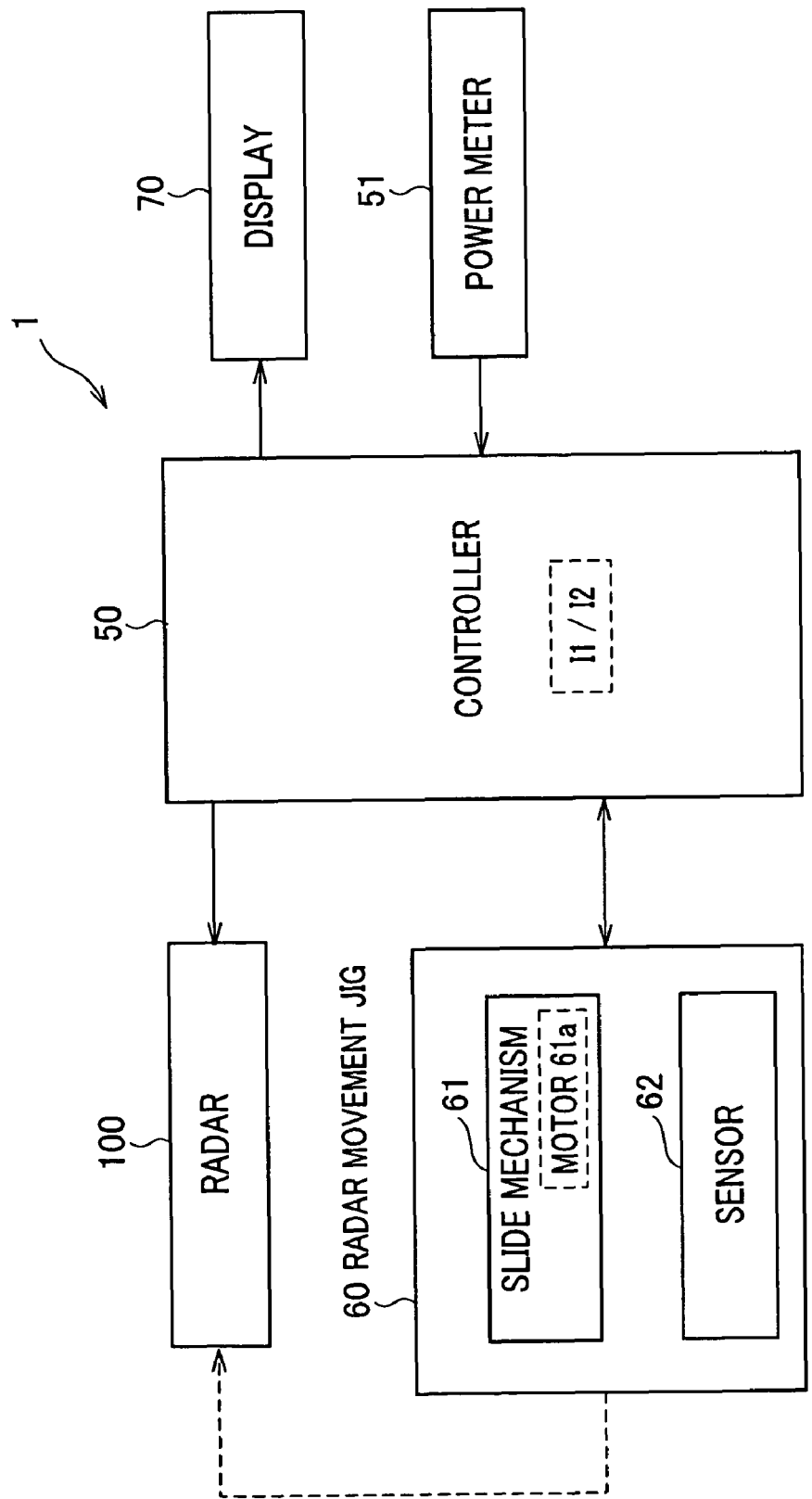

METHOD AND SYSTEM FOR REDUCING POWER LOSS OF TRANSMITTED RADIO WAVE THROUGH COVER

CROSS REFERENCE TO RELATED APPLICATIONS

This application is based on Japanese Patent Application 2007-272711 filed on Oct. 19, 2007. This application claims the benefit of priority from the Japanese Patent Application, so that the descriptions of which are all incorporated herein by reference.

FIELD OF THE INVENTION

The present invention relates to methods and systems for reducing power loss of a transmitted radio wave from a radar through a cover.

BACKGROUND OF THE INVENTION

Radars are widely used for motor vehicles. Specifically, such a radar installed in a motor vehicle works to emit, from its antenna surface, radio waves over a given scanning area around the motor vehicle, and receive, by its antenna surface, radio waves reflected from an object lying in the scanning area based on the emitted radio waves. Based on the received radio waves, the radar works to measure a physical relationship between the object and the radar, such as a distance therebetween, a speed of the object when the object is moved, or the like.

Such a radar to be installed in a motor vehicle is preferably mounted on one end of the motor vehicle such that a radar transmissible cover, such as a bumper, is placed over the radar; this radar mounting arrangement is disclosed in, for example, Japanese Patent Application Publication No. 2003-240838.

The radar mounting arrangement set forth above causes power loss of emitted radio waves from the radar due to heat caused when the emitted radio waves are passed through the cover. The radar mounting arrangement also causes power loss of emitted radio waves from the radar due to influence between the emitted radio waves and reflected radio waves.

The power loss of emitted radio waves from the radar varies with change in the distance between the antenna surface and the cover. This is because the variations in the energy loss due to the distance between the antenna surface of the radar and the cover are believed to be caused by variations in a standing wave generated between the cover and the antenna surface of the radar. Such a standing wave is also believed to vary with change in the frequency of the emitted radio wave from the radar.

For this reason, it is important to reduce the influence of a standing wave generated between the cover and the antenna surface of the radar on the emitted radio waves from the radar to thereby reduce the power loss of the emitted radio waves therefrom.

Moreover, when radars are differently placed in motor vehicles, there are variations in the object measuring performances of the radars. In order to reduce the variations, it is proposed that each of the radars is commonly placed on an inner surface of the cover, such as the bumper, of each motor vehicle.

However, the arrangement of the radar on the inner surface of the cover may cause vibration of the cover and/or a slight impact thereto, resulting in damaging the radar.

SUMMARY OF THE INVENTION

In view of the circumstances set force above, an object of an aspect of the present invention is to provide systems each with a radar and a cover placed over the radar, methods and these systems are capable of reducing power loss of a radio wave emitted from the radar.

According to one aspect of the present invention, there is provided a power-loss reducing method for a radar located such that a cover is placed over the radar with a positional relationship therebetween. The method includes causing the radar to transmit a measurement radio wave, and monitoring power of the measurement radio wave transmitted from the radar through the cover while changing the positional relationship between the cover and the radar. The method includes extracting a value of the changed positional relationship between the cover and the radar based on a result of the monitoring of the power such that the extracted value of the positional relationship allows reduction of power loss of a radar wave transmitted, through the cover, from the radar located based on the extracted value of the positional relationship.

According to another aspect of the present invention, there is provided a power-loss reducing method for a radar located such that a cover is placed over the radar with a positional relationship therebetween. The method includes causing the radar to transmit a measurement radio wave with a frequency, and monitoring power of the measurement radio wave transmitted from the radar through the cover while changing the frequency of the transmitted radio wave. The method includes extracting a value of the changed frequency of the measurement radio wave based on a result of the monitoring of the power such that the extracted value of the changed frequency allows reduction of power loss of a radar wave having the extracted value of the changed frequency and transmitted from the radar through the cover.

According to a further aspect of the present invention, there is provided a power-loss reducing system for a radar located such that a cover is placed over the radar with a positional relationship therebetween. The system includes a transmitting unit configured to cause the radar to transmit a measurement radio wave, and a power monitoring unit configured to monitor power of the measurement radio wave transmitted from the radar through the cover while changing the positional relationship between the cover and the radar. The system also includes an extracting unit configured to extract a value of the changed positional relationship between the cover and the radar based on a result of the monitoring of the power such that the extracted value of the positional relationship allows reduction of power loss of a radar wave transmitted from the radar located based on the extracted value of the positional relationship through the cover.

According to a still further aspect of the present invention, there is provided a power-loss reducing system for a radar located such that a cover is placed over the radar with a positional relationship therebetween. The system includes a transmitting unit configured to cause the radar to transmit a measurement radio wave with a frequency, and a monitoring unit configured to monitor power of the measurement radio wave transmitted from the radar through the cover while changing the frequency of the transmitted radio wave. The system includes an extracting unit configured to extract a value of the changed frequency of the measurement radio wave based on a result of the monitoring of the power such that the extracted value of the changed frequency allows reduction of power loss of a radar wave having the extracted value of the changed frequency and transmitted from the radar through the cover.

BRIEF DESCRIPTION OF THE DRAWINGS

Other objects and aspects of the invention will become apparent from the following description of embodiments with reference to the accompanying drawings in which:

FIG. 1A is a block diagram schematically illustrating an example of the hardware structure of a power-loss reducing system according to a first embodiment of the present invention;

DETAILED DESCRIPTION OF EMBODIMENTS OF THE INVENTION

Figure 1B:
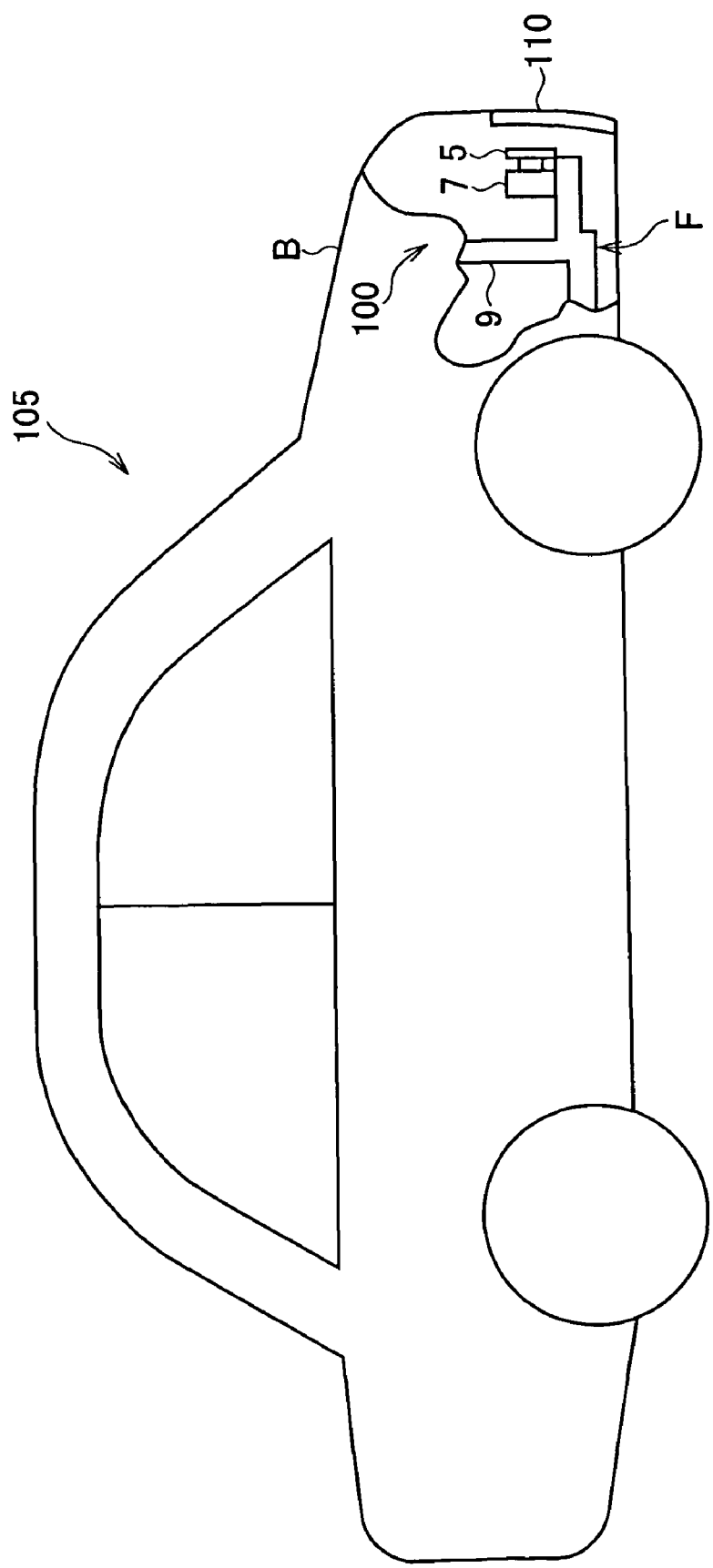
FIG. 1B is an enlarged one side view of a motor vehicle in which a radar illustrated in FIG. 1A is installed beforehand.

Embodiments of the present invention will be described hereinafter with reference to the accompanying drawings. In the drawings, identical reference characters are utilized to identify identical corresponding components.

First Embodiment

Referring to FIGS. 1A and 1B, there is illustrated a power loss reducing system 1 according to a first embodiment of the present invention. The power loss reducing system 1 is designed to:

determine a physical relationship between a radar 100 installed beforehand in a motor vehicle 105 and a predetermined reference position;

determine a proper installation position of the radar 100 in a body (outer shell) B mounted on a frame F of the motor vehicle 105; and automatically locate, when the motor vehicle 105 is being assembled, the radar 100 at the determined proper installation position in the body B.

Referring to FIG. 1B, the bumper 110 is made of a radar transmissible member and mounted on a front grille of a front panel (front body area) of an engine compartment of the body B.

The bumper 110 has a predetermined length (height) in the height direction of the vehicle and a predetermined length (width) in the width direction thereof to thereby protect the front end of the motor vehicle 105.

The radar 100 is arranged on a support member 9 as a part of the frame located in the front panel away from the bumper 110 such that the bumper 110 covers the radar 100 as viewing from the forward side of the motor vehicle 105.

Figure 4:
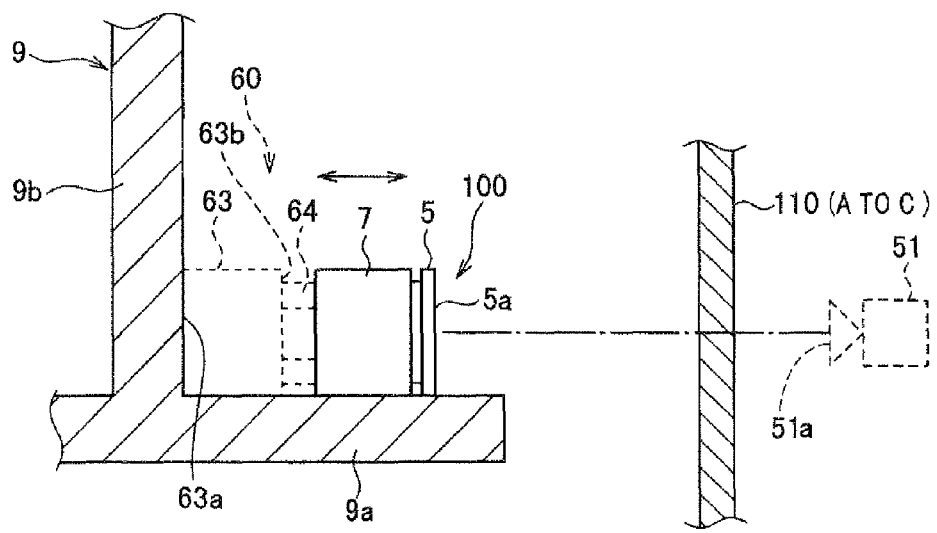
FIG. 4 is a partially cross-sectional view of a radar movement jig illustrated in FIG. 1B while the radar movement jig is arranged on a support member of a part of a frame of the motor vehicle according to the first embodiment.

Specifically, the support member 9 is composed of a base support wall 9a and a reference support wall 9b (see FIG. 4). The base support wall 9a is arranged in the width direction and the front and rear direction of the motor vehicle 105. The reference support wall 9b extends from the base support wall 9a in the height direction such that it faces the bumper 110 with a predetermined interval that allows the radar 100 to be movably mountable on the base support wall 9a.

Specifically, the support member 9 of the frame F is arranged such that the bumper 110 covers the radar 100 when the radar 100 is mounted on the base support wall 9a of the support member 9 to be directed to the bumper 110.

The arrangement of the radar 100 and the bumper 110 hides the radar 100 from external view, especially from the forward side of the motor vehicle 105 to thereby enhance the outer appearance of the motor vehicle 105.

More specifically, after the proper installation position has been determined by the power loss reducing system 1, the radar 100 is fixedly mounted at the determined proper installation position on the base support wall 9a of the support member 9 such that the bumper 110 covers the radar 100. This arrangement allows, when moving obstacles, such as moving stones, may hit the bumper 110, reduction of the impact on the radar 100.

The radar 100 is equipped with a substantially plate-like antenna module 5 for transmitting radio waves from its antenna surface 5a and receiving radio waves therethrough. The antenna module 5 is fixedly mounted at the proper installation position on the base support wall 9a of the support member 9 such that the antenna surface 5a (FIG. 4) is directed to the bumper 110. The radar 100 is also equipped with a main module 7 having a predetermined shaped housing and electrically and mechanically coupled to the antenna module 5. The main module 7 is also fixedly mounted on the determined proper installation position on the base support wall 9a of the support member 9.

Returning to FIG. 1A, the power loss reducing system 1 is equipped with a controller 50, a power meter 51, and a radar movement jig 60.

The power meter 51 is provided with a wave receiving area 51a (FIG. 4) and is to be arranged such that the wave receiving area 51a faces the antenna surface 5a across the bumper 110. The power meter 51 is electrically connected to the controller 50. The power meter 51 works to receive, by the wave receiving area 51a, radio waves emitted from the radar 100, measure electrical power of the received radio waves, and output, to the controller 50, data indicative of the measured power.

Referring to FIG. 4, the radar movement jig 60 is equipped with a base member 63 having a pair of parallel locating faces 63a and 63b, and with a plurality of support arms 64 movably mounted via the locating face 63b in a direction orthogonal to the locating face 63b.

The radar movement jig 60 is also equipped with a slide mechanism 61 (FIG. 1A) with a motor 61a electrically connected to the controller 50. For example, when the motor 61a is rotatably driven by the controller 50 in one direction by a given angle, the slide mechanism 61 works to extend the support arms 64 relative to the locating face 63b by a stroke corresponding to the rotation angle of the motor 61a. This allows the radar 100 to slide toward the bumper 110 on the base support wall 9a.

When the motor 61a is rotatably driven by the controller 50 in the reverse direction by a given angle, the slide mechanism 61 works to shrink the support arms 64 toward the locating face 63b by a stroke corresponding to the rotation angle. This allows the radar 100 to slide toward the reference support wall 9b on the base support wall 9a.

The radar movement jig 60 is further equipped with a sensor 62 (FIG. 1A) working to measure a stroke of the support arms 64 by the slide mechanism 61, and output, to the controller 50, data indicative of the measured stroke of the support arms 64.

The controller 50 is designed as a common microcomputer and its peripherals; this microcomputer consists of a CPU, a rewritable ROM, a RAM, and so on.

The controller 50 is operative to:

store, in its RAM or rewritable ROM, the data measured by the power meter 51 and that measured by the sensor 62 such that they are associated with each other;

determine a proper installation position of the radar 100 on the base support wall 9a of the support member 9; and move the radar 100 by actuating the slide mechanism 61 such that the radar 100 is located at the determined proper installation position.

Figure 2:
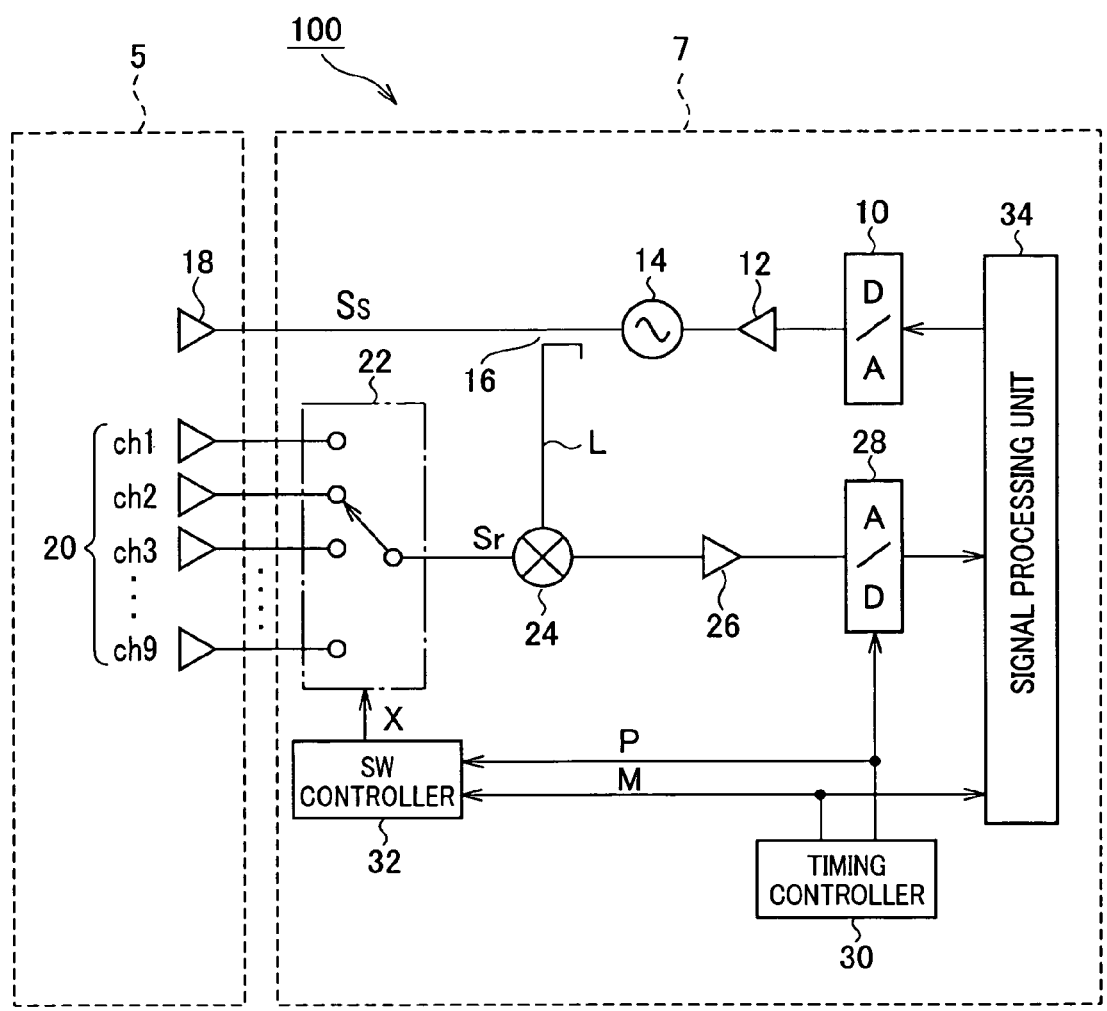
FIG. 2 is a circuit diagram schematically illustrating an example of the electric circuit structure of the radar illustrated in FIGS. 1A and 1B.

FIG. 2 schematically illustrates an example of the electric circuit structure of the radar 100.

The main module 7 includes a digital-to-analog (D/A) converter 10, a buffer 12, a voltage controlled oscillator (VCO) 14, a distributor 16, a receiving switch 22, a mixer 24, an amplifier 26, an analog-to-digital (A/D) converter 28, a timing controller 30, a switch controller 32, and a signal processing unit 34. These components 10, 12, 14, 16, 18, 22, 24, 26, 28, 30, 32, and 34 are installed in the housing of the main module 7.

The antenna unit 5 includes a single transmitting antenna 18 and a plurality of receiving antennas 20 arranged in array.

The D/A converter 10 works to generate a triangular modulation voltage signal in accordance with a modulation command sent from the signal processing unit 34.

The voltage controlled oscillator 14 works to receive the triangular modulation voltage signal via the buffer 16, and to generate a signal with an oscillating frequency is controlled by the received triangular modulation voltage signal.

Specifically, the voltage controlled oscillator 14 works to generate, based on the received triangular modulation voltage signal, a millimeter high-frequency signal with a center frequency of, for example, 76 GHz; the frequency of the millimeter high-frequency signal is linearly changed in a positive sense and a negative sense over time within a range ΔF of, for example, 100 MHz.

The distributor 16 works to distribute the millimeter high-frequency signal into a positively and negatively chirped transmission signal Ss and a local signal L.

The transmitting antenna 18 works to radiate a positively and negatively chirped millimeter radio wave based on the positively and negatively chirped transmission signal Ss so as to scan a predetermined scan zone in front of the motor vehicle 105.

The plurality of receiving antennas 20, such as nine channel antennas ch1 to ch9, work to receive echo signals based on the radiated millimeter radio wave.

The receiving switch 22 works to select any one of the nine receiving antennas ch1 to ch9 based on a selection signal X sent from the switch controller 32, and to supply an echo signal Sr received by selected one of the receiving antennas ch1 to ch9 to the mixer 24.

The mixer 24 works to mix the echo signal Sr with the distributed local signal L to thereby produce a beat signal B with a frequency that corresponds to the difference in frequency between the transmitted millimeter radio wave and the echo signal Sr.

The amplifier 26 works to amplify the beat signal B.

The A/D converter 28 works to sample the amplified beat signal B in accordance with a timing signal P sent from the timing controller 30 to thereby produce digital data, and to output the produced digital data to the signal processing unit 34.

The timing controller 30 works to generate the timing signal P and a mode signal M, and the switch controller 32 works to generate the selection signal X based on the timing signal P and the mode signal M.

The signal processing unit 34 works to output, to the D/A converter 10, the modulation command according to the mode signal M, and to subject the sampled digital data to predetermined signal processing to thereby achieve: a distance between the motor vehicle 105 and an object that reflects the transmitted millimeter radio wave, a relative speed between the motor vehicle 105 and the object, and/or an orientation of the object relative to the motor vehicle 105.

Each of the antennas ch1 to ch9 has a pre-designed beam width that includes a beam width of the transmitting antenna 18. The beam width represents an angular range within which reduction in gain with respect to a front direction of an antenna is equal to or less than 3 dB.

The timing controller 30 works to generate the timing signal P consisting of, for example, a train of pulses with a cycle of 1/fx and the mode signal M according to a control mode.

Specifically, the receiving switch 22 works to switch from one of the nine receiving antennas ch1 to ch9 to an alternative one of the nine receiving antennas ch1 to ch9 at the cycle of 1/fx based on the selection signal X sent from the switch controller 32.

The signal processing unit 34 is designed as, for example, a common microcomputer and its peripheries; this microcomputer consists of a CPU, a rewritable ROM, a RAM, and so on. The signal processing unit 34 also includes a signal processor, such as a digital signal processor (DSP).

The signal processor works to carry out a fast Fourier transform (FFT) based on the sampled digital data to thereby determine a frequency (up-modulation frequency) of the beat signal during the frequency of the transmission signal Ss increasing and a frequency (down-modulation frequency) of the beat signal during the frequency of the transmission signal Ss decreasing.

The signal processing unit 34 is programmed to generate the modulation command that determines a sweep time T being expressed by "T=Dpc×1/fx"; this Dpc represents the number of samples by the A/D converter 28 for each channel of the receiving antennas ch1 to ch9. The sweep time T includes a period of time required for the modulated frequency of the transmission signal Ss to reach a highest frequency from a lowest frequency defining the range ΔF, and a period of time required for the modulated frequency of the transmission signal Ss to reach the lowest frequency from the highest frequency. The D/A converter 10 works to generate the triangular modulation voltage signal based on the sweep time T.

The signal processing unit 34 is programmed to carry out, based on the sampled digital data of the beat signal, a task to compute a distance between the motor vehicle 105 and an object that reflects the transmitted millimeter radio wave, a relative speed between the motor vehicle 105 and the object and/or an orientation of the object relative to the motor vehicle 105.

Echo signals reflected by an object based on the transmitted millimeter radio wave and returned therefrom are respectively received by the receiving antennas ch1 to ch9. One echo signal Sr received by one receiving antenna chi (i is any one of 1 to 9) selected by the receiving switch 22 is only supplied to the mixer 24.

In the mixer 24, the local signal L distributed from the transmission signal Ss by the distributor 16 is mixed with the echo signal Sr so that the beat signal is generated. The beat signal is amplified by the amplifier 26 to be sampled by the A/D converter 28 every pulse of the timing signal P. The sampled digital data corresponding to the beat signal is captured by the signal processing unit 34.

The signal processing unit 34 is further configured to output, to the D/A converter 10, the modulation command in response to a command sent from the controller 50.

In the first embodiment, as described above, the radar 100 is arranged on the support member 9 away from the bumper 110 such that the bumper 110 covers the radar 100 as viewing from the forward side of the motor vehicle 105. For this reason, electrical power of the millimeter radio wave transmitted from the transmitting antenna 18 of the radar 100 varies depending on the distance between the radar and the bumper 110.

Thus, the inventors of the present application carried out experiments to find out a relationship between a variable of the distance between the radar 100 and the bumper 110 and that of the electrical power of the millimeter radio wave transmitted from the radar 100

Figure 3:
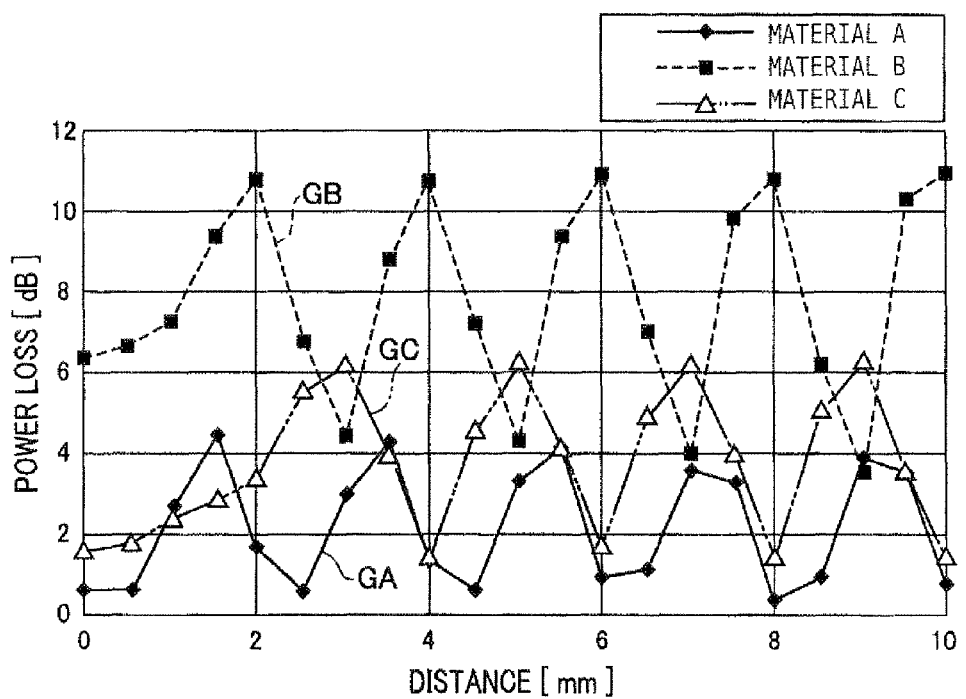
FIG. 3 is graphs each representing a relationship between a variable of a distance between the radar and each of three-types bumper materials and a variable of power loss due to a corresponding one of the three-types bumper materials according to the first embodiment.

FIG. 3 demonstrates a result of the experiments. Specifically, FIG. 3 illustrates:

a first relationship between a variable of the distance between the radar 100 and the bumper 110 and that of the electrical power of the millimeter radio wave transmitted from the radar 100 when the bumper 100 is made of a preselected material A;

a second relationship between a variable of the distance between the radar 100 and the bumper 110 and that of the electrical power of the millimeter radio wave transmitted from the radar 100 when the bumper 100 is made of a preselected material B; and a third relationship between a variable of the distance between the radar 100 and the bumper 110 and that of the electrical power of the millimeter radio wave transmitted from the radar 100 when the bumper 100 is made of a preselected material C.

Note that each of the materials A to C for the bumper 110 consists of a radar-transmissible resin material on which a paint is coated; this paint-coated resin material can be normally used to produce the bumper 110.

In the experiments, each of the bumper materials A to C is located in front of the radar 100, and the power meter 51 is arranged such that the wave receiving area 51a faces the antenna surface 5a across each of the bumper materials A to C (see FIG. 4).

Thereafter, the main module 7 is controlled to radiate the millimeter radio wave with a wavelength $\lambda$ of, for example, an about 4 millimeters (mm) from the antenna 5 while the distance between the radar 100 and each of the bumper materials A to C is changed.

At that time, the power meter 51 receives the millimeter radio wave transmitted from the antenna 5 at each value of the distance between the radar 100 and each of the bumper materials A to C. Thereafter, the power meter 51 measures electrical power of the received millimeter radio wave at each value of the distance between the radar 100 and each of the bumper materials A to C.

In the first embodiment, no bumper materials are located in front of the radar 100, and the power meter 51 is arranged such that the wave receiving area 51a faces the antenna surface 5a. Thereafter, the main module 7 is controlled to radiate the millimeter radio wave from the antenna 5 so that the power meter 51 receives the millimeter radio wave transmitted from the antenna 5, and measures electrical power of the received millimeter radio wave as reference electrical power. The reference electrical power is stored in the RAM or rewritable ROM of the controller 50.

The difference between the measured electrical power of the received millimeter radio wave at each value of the distance between the radar 100 and each of the bumper materials A to C and the reference electrical power is calculated as power loss in decibels.

Referring to FIG. 3, a graph GA represents a relationship between a variable of the distance between the radar 100 and the bumper material A and a variable of the power loss corresponding to the bumper material A. A graph GB represents a relationship between a variable of the distance between the radar 100 and the bumper material B and a variable of the power loss corresponding to the bumper material B. A graph GC represents a relationship between a variable of the distance between the radar 100 and the bumper material C and a variable of the power loss corresponding to the bumper material C.

FIG. 3 clearly demonstrates that, even if any one of the bumper materials A to C is used to produce the bumper 110, the power loss varies to be locally minimized over a cycle of an about 2 mm ($\lambda/2$) and locally maximized over a cycle of an about 2 mm ($\lambda/2$). However, a value of the distance between the radar 100 and each of the bumper materials A to C at which the power loss is locally maximized or minimized becomes varied depending on which type of materials is used to produce the bumper 110.

The reason why a value of the distance between the radar 100 and each of the bumper materials A to C at which the power loss is locally maximized becomes varied is probably estimated to be the difference in characteristics of the bumper materials to be used as the bumper 110. The characteristics include characteristics of paints to be coated on the bumper materials, characteristics of the bumper materials themselves, and/or dielectric constants of the bumper materials.

In the first embodiment, in order to optimize the object detecting characteristic of the radar 100 independently of the characteristics of the bumper material to be used as the bumper 110, the power loss reducing system 1 is configured to determine a proper distance between the bumper 110 and the radar 100 while monitoring the electric power of the radar 100.

As described above, when the motor 61a is rotatably driven by the controller 50 in one direction by a given angle, the slide mechanism 61 works to:

extend the support arms 64 from the locating face 63b to thereby slide the radar 100 toward the bumper 110 on the base support wall 9a; and shrink the support arms 64 toward the locating face 63b to thereby slide the radar 100 toward the reference support wall 9b on the base support wall 9a.

The reciprocating direction of the support arms 64 and the slide direction of the radar 100 are configured to be in agreement with the transmitting direction of the millimeter radio wave by the radar 100. For this reason, when the power loss reducing system 1 starts to carry out such a proper distance determining task, the power meter 51 is arranged such that the wave receiving area 51*a* faces the antenna surface 5*a* across the bumper 110 on the transmitting direction of the millimeter radio wave by the radar 100.

Figure 5:
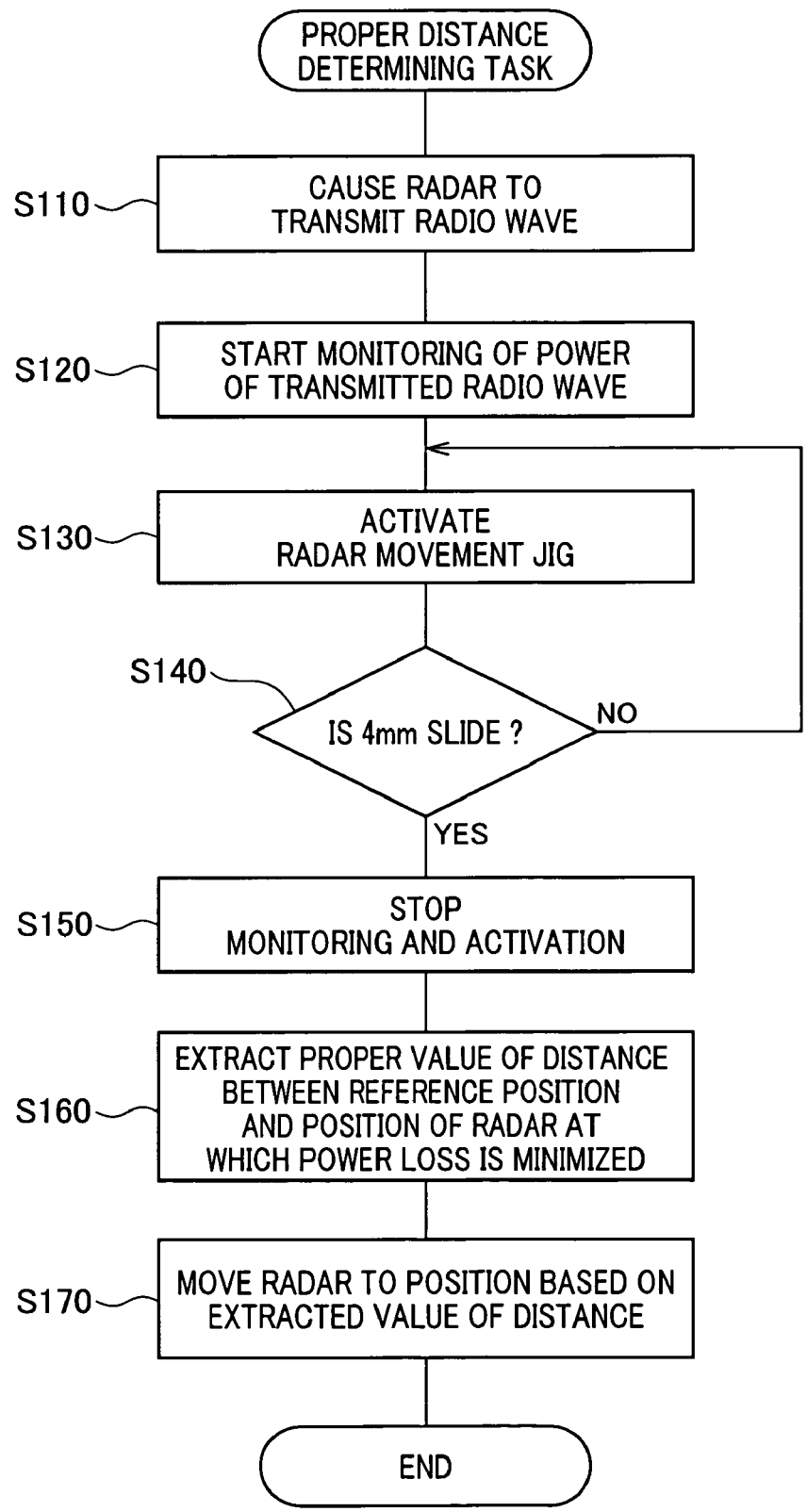
FIG. 5 is a flowchart schematically illustrating a proper distance determining task to be executed by a controller illustrated in FIG. 1A according to the first embodiment.

Next, the proper distance determining task to be executed by the controller 50 according to the first embodiment will be described hereinafter with reference to FIG. 5. For example, at least one proper distance determining program installed in, for example, the rewritable ROM of the controller 50 instructs the controller 50 (its CPU) to execute the proper distance determining task.

Note that the proper distance determining program is launched when a command indicative of the start of the proper distance determining task is inputted. For example, when a switch (not shown) electrically connected to the controller 50 is turned on by an operator, the proper distance determining program is launched. Note that, before the start of the proper distance determining task, the support arms 64 are originally positioned such that an amount of extension of each support arm 64 is zero. When the support arms 64 are originally positioned, a distance between the bumper 110 and the radar 100 (antenna surface 5*a*) is predetermined. When the support arms 64 are originally positioned, the radar 100 (antenna surface 5*a*) is located at a reference position.

When the proper distance determining program is launched, the controller 50 causes the radar 100 to transmit the millimeter radio wave in step S110, and starts to monitor the electrical power of the transmitted millimeter radio wave in step S120. Specifically, the controller 50 causes the power meter 50 to measure the electrical power of the transmitted millimeter radio wave via the bumper 110 every predetermined sampling period in step S120.

In other words, the controller 50 starts to perform a task for storing, in its RAM or rewritable ROM, data measured by the power meter 51 and that measured by the sensor 62 such that they are associated with each other in step S120.

Next, the controller 50 causes the slide mechanism 61 to extend the support arms 64 to slide the radar 100 toward the bumper 110 at a predetermined speed in step S130. In other words, the controller 50 drives the motor 61*a* in the one direction at a predetermined RPM to thereby slide the radar 100 toward the bumper at the predetermined speed of, for example, 1 mm/s (millimeter/second) in step S130.

Note that the predetermined sampling period in step S120 is determined based on the slide speed of the radar 100 such that the electrical power of the transmitted millimeter radio wave is measured by the power meter 50 every slide pitch of the radar 100 about 0.1 mm.

Specifically, when the slide mechanism 61 slides the radar 100 at the predetermined speed of 1 mm/s, the sampling period is determined to 10 Hz.

Subsequently, the controller 50 determines whether the total amount of the slide of the radar 100 toward the bumper 110 reaches 4 mm as a preset slide limit in step S140. In other words, the controller 50 determines whether the radar 100 slides by the wavelength of the transmitted millimeter radio wave in step S140.

The reason why the controller 50 slides the radar 100 by the wavelength of the transmitted meter radio wave is as follows.

That is, as illustrated in FIG. 3, the power loss varies to be locally minimized over a cycle of an about 2 mm ($\lambda/2$). For this reason, sliding of the radar 100 by the wavelength of the transmitted millimeter radio wave allows measurement of two values (points) of the distance between the radar 100 and the bumper 110 at each of which the power loss is locally minimized. This makes it possible to determine a distance between the radar 100 and the bumper 110 such that the power loss is more reduced.

Upon determining that the total amount of the slide of the radar 100 toward the bumper 110 does not reach 4 mm (NO in step S140), the controller 50 returns to the operation in step S130, and repeats the operations in steps S130 and S140.

Otherwise, upon determining that the total amount of the slide of the radar 100 toward the bumper 110 reaches 4 mm (YES in step S140), the controller 50 stops the actuate of the slide mechanism 61, the transmission of the millimeter radio wave from the radar 100, and the measurement of the electrical power of the millimeter radio wave in step S150.

Thereafter, in step S160, the controller 50 references the information I1 stored in the RAM or the rewritable ROM and indicative of the relationship between values of the measured electrical power and corresponding values of the stroke of the radar 100 (antenna surface 5*a*). Based on a result of the reference and the reference electrical power, the controller 50 extracts a value of the slide of the radar 100 at which the power loss is minimized in step S160.

After the operation in step S160 is completed, the controller 50 actuates the slide mechanism 61 to slide the radar 100 so that the radar 100 (antenna surface 5*a*) is located at a proper installation position having the extracted distance from the reference position. The proper installation position allows the power loss of the transmitted millimeter radio wave to be minimized in step S170. Thereafter, the controller 50 terminates the proper distance determining task.

After the proper distance determining task is completed, an operator fixes the radar 100 at the proper installation position on the base support wall 9*a* of the support member 9 with predetermined locking (fixing members). Thereafter, the radar movement jig 60 is removed from the radar 100, and the controller 50 and the radar 100 are also electrically disconnected from each other.

The radar 100 can be automatically fixed at the proper installation position on the base support wall 9*a* of the support member 9 by a predetermined jig. The radar movement jig 60 can be integrally mounted on the base support wall 9*a* of the support member 9.

As described above, the power loss reducing system 1 according to the first embodiment is equipped with:

the radar movement jig 60 designed to move the radar 100 between the reference position and the slide limit; and the power meter 51 operative to monitor the millimeter radar wave transmitted from the radar 100 through the bumper 100.

In addition, the controller 50 of the power loss reducing system 1 is programmed to cause the radar movement jig 60 to slide the radar 100 from the reference position up to the slide limit. During the radar 100 being slid, the controller 50 causes the power meter 51 to monitor the electrical power of the transmitted millimeter radio wave such that a value of the monitored data is associated with a corresponding positional relationship between the reference position and the position of the radar 100.

Based on the information I1 indicative of values of the monitored data being associated with corresponding values of the positional relationship between the reference position and the position of the radar 100, the controller 50 extracts a value of the positional relationship between the reference position and the position of the radar 100 at which the power loss is locally minimized or minimized.

The extracted value of the positional relationship between the reference position and the position of the radar 100 allows reduction of the influence of a standing wave generated between the bumper 110 and the antenna surface 5a of the radar 100. This is because a standing wave varies with change in the distance between the bumper 110 and the antenna surface 5a of the radar 100.

Thereafter, the controller 50 causes the radar movement jig 60 to slide the radar 100 so as to meet the extracted value of the positional relationship between the reference position and the position of the radar 100.

Accordingly, the power loss reducing system 1 according to the first embodiment achieves an effect of automatically placing the radar 100 at a proper installation position where the power loss is reduced, making it possible to reduce the power loss due to the passing of the millimeter radio wave through the bumper 110.

The power loss reducing system 1 according to the first embodiment also causes the radar movement jig 60 to linearly slide the radar 100 to thereby change the difference between the radar 100 and the bumper 110. This allows the electrical power of the millimeter radio wave transmitted from the radar 100 to be monitored without sliding the power meter 51, making it possible to simplify the structure of the power loss reducing system 1.

In the power loss reducing system 1, the distance between the reference position and the slide limit is determined to a length equal to or greater than the half of the wavelength of the millimeter radio wave.

Thus, in the power loss reducing system 1, a locally minimized point of the power loss appears each time the distance between the reference position and the position of the radar 100 is slid by the half of the wavelength of the transmitted millimeter radio wave. Thus, it is possible to reliably locate the radar 100 at any one of the locally minimized points.

Second Embodiment

Figure 6:
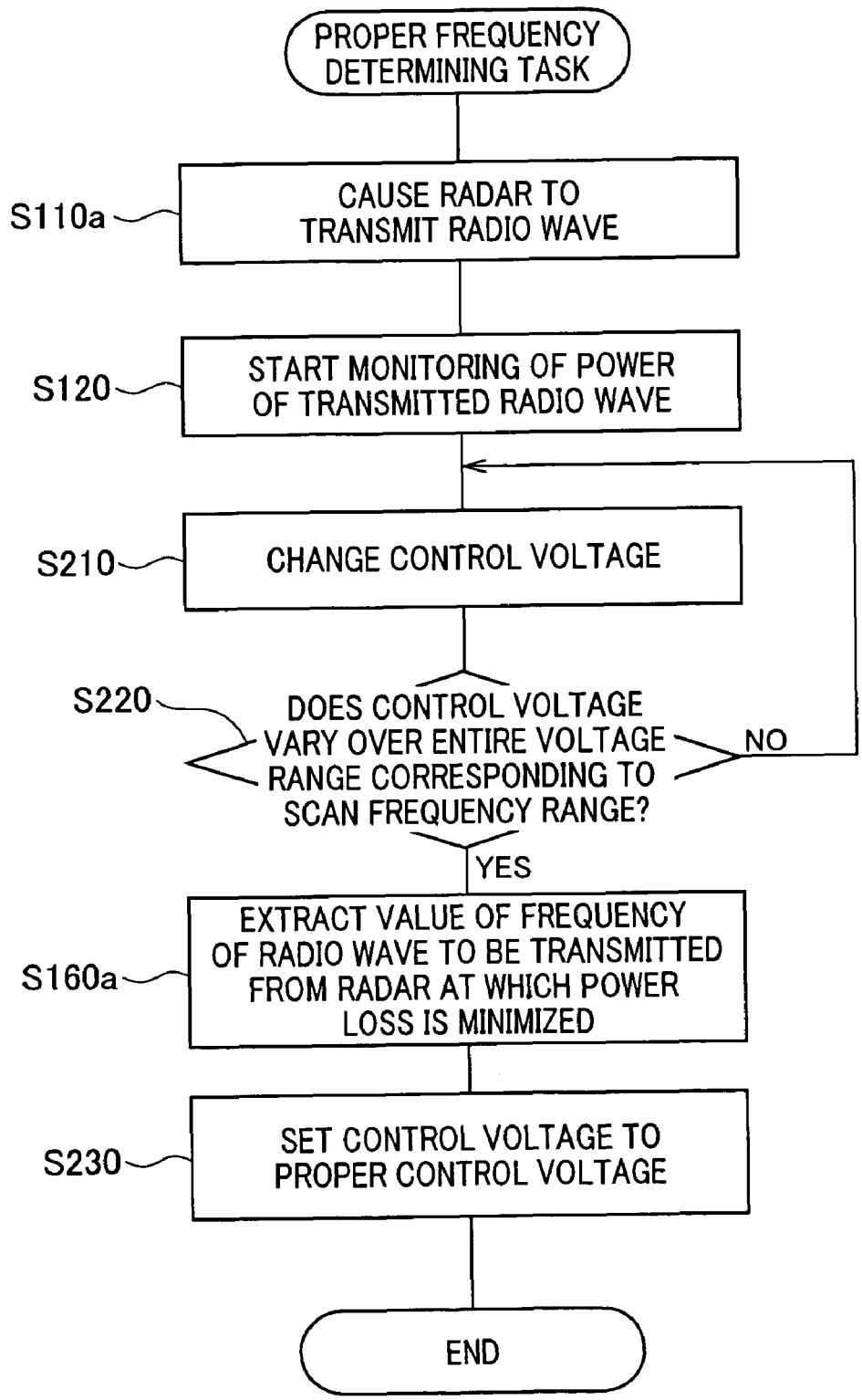
FIG. 6 is a flowchart schematically illustrating a proper frequency determining task to be executed by the controller illustrated in FIG. 1A according to a second embodiment of the present invention.
Figure 7:
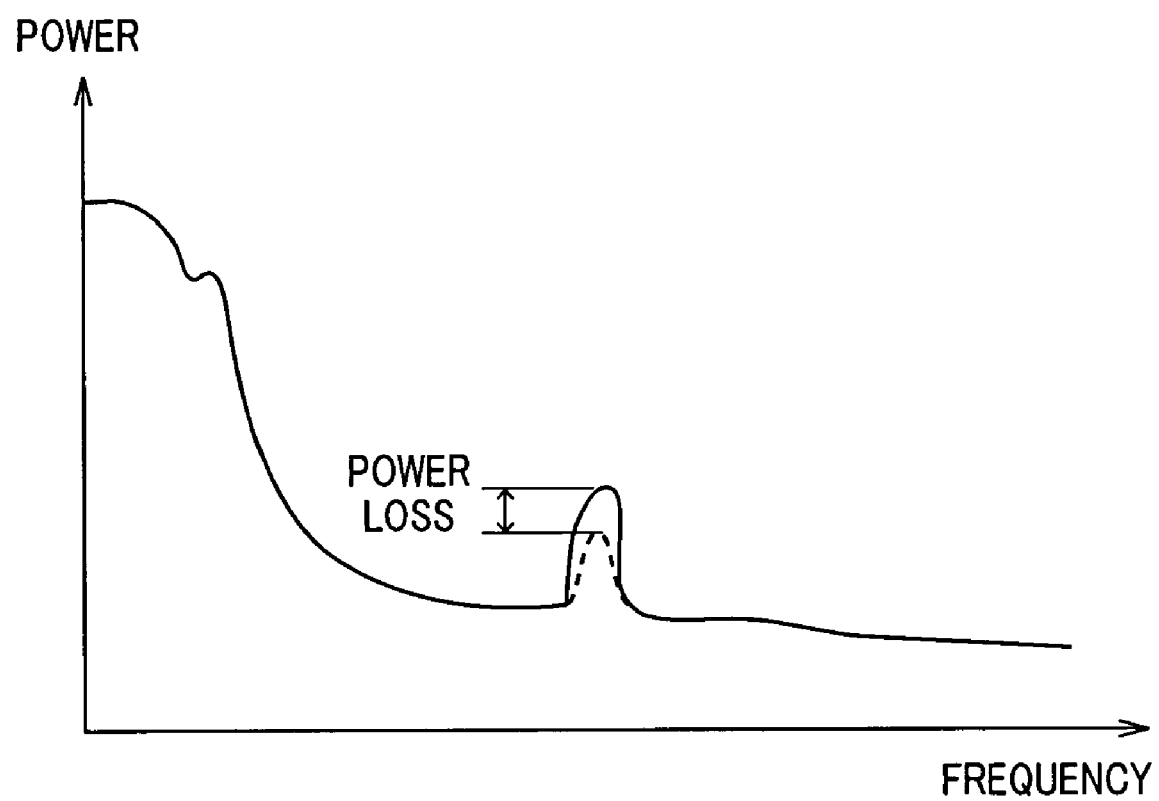
FIG. 7 is a graph schematically illustrating a frequency spectrum of an FFT-processed beat signal when the bumper 110 is located and that of an FFT-processed beat signal when no bumper 100 is located according to a modification of each of the first and second embodiments of the present invention.

A system according to a second embodiment of the present invention will be described hereinafter with reference to FIG. 6.

The hardware structure of the system according to the second embodiment is substantially identical to that of the power loss reducing system 1 according to the first embodiment except that the radar movement jig 60 is omitted. Thus, like parts between the systems according to the first and second embodiments, to which like reference characters are assigned, are omitted or simplified in description.

Next, a proper frequency determining task to be executed by the controller 50 according to the second embodiment will be described hereinafter with reference to FIG. 6.

Note that the proper frequency determining program is launched when a command indicative of the start of the proper frequency determining task is inputted. For example, when a switch (not shown) electrically connected to the controller 50 is turned on by an operator, the proper frequency determining program is launched.

When the proper frequency determining program is launched, the controller 50 causes the radar 100 to transit the millimeter radio wave in step S110, and starts to monitor the electrical power of the transmitted millimeter radio wave in step S120a. Specifically, the controller 50 causes the power meter 50 to measure the electrical power of the transmitted millimeter radio wave via the bumper 110 every time a frequency of the millimeter radio wave is changed in step S120a. The frequency of the millimeter radio wave to be transmitted from the radar 100 at the start of the proper frequency determining task is determined, as an original frequency, to 76.05 GHz In other words, the controller 50 starts to perform a task for storing, in its RAM or rewritable ROM, data measured by the power meter 51 and the frequency of the millimeter radio wave such that they are associated with each other in step S120a.

Next, the controller 50 changes a control voltage to be applied to the voltage controlled oscillator 14 such that an oscillating frequency for the millimeter radio wave generated by the voltage controlled oscillator 14 increases, by a predetermined frequency, from an actual oscillating frequency thereof in step S210. Specifically, the controller 50 causes the signal processor 34 of the radar 110 to output the modulation command that increases, by the predetermined frequency, the oscillating frequency for the millimeter radio wave in step S210.

The change in the oscillating frequency of the voltage controlled oscillator 14 allows change in the frequency of the millimeter radio wave.

Subsequently, the controller 50 determines whether a control voltage to be applied to the voltage controlled oscillator 14 in step S210 reaches a limit voltage corresponding to a limit frequency of the millimeter radio wave of, for example, 76.95 GHz in step S220.

In other words, in step S220, the controller 50 determines whether a control voltage to be applied to the voltage controlled oscillator 14 is changed (is scanned) in given voltage steps over an entire voltage range between an original voltage corresponding to the original frequency of 76.05 GHz and the limit voltage corresponding to the limit frequency of 76.95 GHz. The frequency range between the original frequency and the limit frequency serves as a scan frequency range to find a frequency at which the power loss of the transmitted millimeter radio wave is minimized.

Specifically, in step S220, the controller 50 can carry out the determination by checking whether to cause the signal processor 34 of the radar 110 to output the modulation command that increases the oscillating frequency for the millimeter radio wave up to the limit frequency without monitoring a control voltage to be applied to the voltage controlled oscillator 14 in step S210.

Upon determining that a control voltage to be applied to the voltage controlled oscillator 14 in step S210 does not reach the limit voltage corresponding to the limit frequency of the millimeter radio wave (NO in step S220), the controller 50 returns to the operation in step S210, and repeats the operations in steps S210 and S220.

Otherwise, upon determining that a control voltage to be applied to the voltage controlled oscillator 14 in step S210 reaches the limit voltage corresponding to the limit frequency of the millimeter radio wave (YES in step S220), the controller 50 proceeds to step S160a.

In step S160a, the controller 50 references the information I2 stored in the RAM or the rewritable ROM and indicative of the relationship between values of the measured electrical power and corresponding values of the frequency of the millimeter radio wave to be transmitted from the radar 100. Based on a result of the reference and the reference electrical power, the controller 50 extracts a value of the frequency of the millimeter radio wave to be transmitted from the radar 100 at which the power loss is minimized in step S160a.

The extracted value of the frequency of the millimeter radio wave to be transmitted from the radar 100 allows reduction of the influence of a standing wave generated between the bumper 110 and the antenna surface 5a of the radar 100. This is because a standing wave varies with change in the frequency of the millimeter radio wave to be transmitted from the radar 100.

After the operation in step S160a is completed, the controller 50 causes the signal processor 34 of the radar 100 to output the modulation command that sets the oscillating frequency for the millimeter radio wave to the extracted value of the frequency of the millimeter radio wave.

Thus, when the radar 100 is actually used to detect objects in front of the motor vehicle 105, the frequency of the millimeter radio wave (the oscillating frequency of the voltage controlled oscillator 14) is determined to a value of the frequency of the millimeter radio wave at which the power loss is minimized based on the information I2 stored in the RAM or rewritable ROM of the controller 50.

As described above, in the power loss reducing system 1 according to the second embodiment, the controller 50 is configured to change the frequency of the millimeter radio wave to be transmitted from the radar 100.

Thus, the controller 50 sequentially changes the frequency of the millimeter radio wave to be transmitted from the radar 100 from, for example, the original frequency to, for example, the limit frequency. During the frequency of the millimeter radio wave to be transmitted from the radar 100 being changed, the controller 50 causes the power meter 51 to monitor the electrical power of the transmitted millimeter radio wave such that a value of the monitored data is associated with a corresponding value of the frequency of the meter radio wave to be transmitted from the radar 100.

Based on the information I2 indicative of values of the monitored data being associated with corresponding values of the frequency of the millimeter radio wave, the controller 50 extracts a value of the frequency of the millimeter radio wave at which the power loss is minimized.

Thereafter, the controller 50 causes the signal processor 34 of the radar 100 to output the modulation command that sets the oscillating frequency for the millimeter radio wave to the extracted value of the frequency of the millimeter radio wave.

Accordingly, the power loss reducing system 1 according to the second embodiment achieves an effect of automatically determining the frequency of the millimeter radio wave to be transmitted from the radar 100 to a proper frequency where the power loss is minimized, making it possible to minimize the power loss due to the passing of the millimeter radio wave through the bumper 110.

Various modifications of the first and second embodiments of the present invention can be implemented.

In the first embodiment, the radar movement jig 60 is configured to move the radar 100 in one dimension, but can be configured to move the radar 100 in two or three dimension like a robot arm. In this modification, the power meter 51 is required to move such that the wave receiving area 51a faces the antenna surface 5a across the bumper 110 on the transmitting direction of the millimeter radio wave by the radar 100 at any times.

The power loss reducing system 1 according to the first embodiment is configured to automatically locate the radar 100 at the determined proper installation position on the base support wall 9a of the support member 9. Similarly, the power loss reducing system 1 according to the second embodiment is configured to automatically determine the frequency of the millimeter radio wave to be transmitted from the radar 100 to a proper frequency. However, the present invention is not limited to the structures of the power loss reducing systems.

The power loss reducing system 1 according to the first embodiment can be configured to visibly output the determined proper installation position on a display 70 illustrated in FIG. 1A by imaginary lines. This allows, when the motor vehicle 105 is being assembled, an assembler to fixedly locate the radar 100 to the determined proper installation position on the base support wall 9a of the support member 9 in accordance with the proper installation position displayed on the display 70.

Similarly, the power loss reducing system 1 according to the second embodiment can be configured to visibly output the determined frequency of the millimeter radio wave on the display 70. This allows, when the radar 100 is being adjusted, an operator to set the frequency of the millimeter radio wave to be transmitted from the radar 100 to the proper frequency displayed on the display 70.

In the first and second embodiments, the power loss reducing system 1 is configured to properly determine a positional relationship between the bumper 110 and the radar 100, or properly determine a frequency of the millimeter radio wave to be transmitted from the radar 100 to thereby reduce the influence of a standing wave generated between the bumper 110 and the antenna surface 5a of the radar 100. In the present invention, in addition to the determination of the positional relationship between the bumper 110 and the radar 100 and that of the frequency of the millimeter radio wave to be transmitted from the radar 100, characteristics and/or structures of the bumper 110, such as a paint to be coated on the bumper 110, a bumper material of the bumper 110, and/or a width of the bumper 110 can be properly determined to reduce the influence of a standing wave generated between the cover and the antenna surface 5a of the radar 100.

In the first embodiment, when the power loss is measured by the power loss reducing system 1, an object that reflects the millimeter radio wave transmitted from the radar 100 can be located across the bumper 110 in place of the power meter 51 (see FIG. 4).

In this modification, the power loss reducing system 1 can be configured to measure the difference between the received power of an echo signal when the bumper 110 is located and that of an echo signal when no bumper 100 is located. In this modification, the power loss reducing system 1 can be configured to measure the difference between the power of the FFT-processed beat signal when the bumper 110 is located and that of the FFT-processed beat signal when no bumper 100 is located.

In each of the first and second embodiments and their modifications, the frequency-modulated radio wave in the millimeter wave band is used as a radio wave, but the present invention is not limited to the usage.

Specifically, a radio wave in another wave band modulated in one of various modulation methods, such as pulse modulation or spread spectrum modulation, can be used.

In each of the first and second embodiments, the bumper 110 placed to cover the radar 100 is used as an example of covers, but another type of members placed to cover the radar 100 can be used.

While there has been described what is at present considered to be the embodiments and their modifications of the present invention, it will be understood that various modifications which are not described yet may be made therein, and it is intended to cover in the appended claims all such modifications as fall within the true spirit and scope of the invention.

What is claimed is:

1. A power-loss reducing method for a radar located such that a cover is placed over the radar with a positional relationship therebetween, the method comprising:

causing the radar to transmit a measurement radio wave;

monitoring power of the measurement radio wave transmitted from the radar through the cover while changing the positional relationship between the cover and the radar; and extracting a value of the changed positional relationship between the cover and the radar based on a result of the monitoring of the power such that the extracted value of the positional relationship allows reduction of power loss of a radar wave transmitted, through the cover, from the radar located based on the extracted value of the positional relationship.

2. The method according to claim 1, wherein the monitoring step includes:
monitoring the power of the measurement radio wave transmitted from the radar through the cover while moving the radar from a predetermined reference position to a predetermined limit position, further comprising:
moving the radar to locate the radar at a position so that a positional relationship between the radar located at the position and the cover is matched with the extracted value of the changed positional relationship between the cover and the radar.

3. A power-loss reducing method for a radar located such that a cover is placed over the radar with a positional relationship therebetween, the method comprising:
causing the radar to transmit a measurement radio wave with a frequency;
monitoring power of the measurement radio wave transmitted from the radar through the cover while changing the frequency of the transmitted radio wave; and
extracting a value of the changed frequency of the measurement radio wave based on a result of the monitoring of the power such that the extracted value of the changed frequency allows reduction of power loss of a radar wave having the extracted value of the changed frequency and transmitted from the radar through the cover.

4. The method according to claim 3, where the monitoring step includes:
monitoring the power of the measurement radio wave transmitted from the radar trough the cover while changing the frequency of the measurement radio wave from a predetermined frequency to a predetermined limit frequency, further comprising:
adjusting a frequency of a radio wave to be transmitted from the radar so that the adjusted frequency is matched with the extracted value of the changed frequency.

5. A power-loss reducing system for a radar located such that a cover is placed over the radar with a positional relationship therebetween, the system comprising:
a transmitting unit configured to cause the radar to transmit a measurement radio wave;
a power monitoring unit configured to monitor power of the measurement radio wave transmitted from the radar through the cover while changing the positional relationship between the cover and the radar; and
an extracting unit configured to extract a value of the changed positional relationship between the cover and the radar based on a result of the monitoring of the power such that the extracted value of the positional relationship allows reduction of power loss of a radar wave transmitted from the radar located based on the extracted value of the positional relationship through the cover.

6. The system according to claim 5, wherein the power monitoring unit is configured to monitor the power of the measurement radio wave transmitted from the radar through the cover while moving the radar from a predetermined reference position to a predetermined limit position, further comprising:
a moving unit configured to move the radar to locate the radar at a position so that a positional relationship between the radar located at the position and the cover is matched with the extracted value of the changed positional relationship between the cover and the radar.

7. The system according to claim 5, wherein the moving unit is configured to linearly move the radar so as to change a distance between the cover and the radar.

8. The system according to claim 6, wherein the measurement radio wave has a wavelength, and a distance between the predetermined reference position and the predetermined limit position is determined to the half of the wavelength of the measurement radio wave.

9. A power-loss reducing system for a radar located such that a cover is placed over the radar with a positional relationship therebetween, the system comprising:
a transmitting unit configured to cause the radar to transmit a measurement radio wave with a frequency;
a monitoring unit configured to monitor power of the measurement radio wave transmitted from the radar through the cover while changing the frequency of the transmitted radio wave; and
an extracting unit configured to extract a value of the changed frequency of the measurement radio wave based on a result of the monitoring of the power such that the extracted value of the changed frequency allows reduction of power loss of a radar wave having the extracted value of the changed frequency and transmitted from the radar through the cover.

10. The system according to claim 9, wherein the monitoring unit is configured to monitor the power of the measurement radio wave transmitted from the radar through the cover while changing the frequency of the measurement radio wave from a predetermined frequency to a predetermined limit frequency, further comprising:
an adjusting unit configured to adjust a frequency of a radio wave to be transmitted from the radar so that the adjusted frequency is matched with the extracted value of the changed frequency.

* * * * *